Aug. 25, 1942. W. ERNST Re. 22,163

DOUBLE-ACTING PRESS

Original Filed Sept. 16, 1936 3 Sheets-Sheet 1

INVENTOR
WALTER ERNST

Toulmin & Toulmin
ATTORNEYS

DOUBLE-ACTING PRESS

Original Filed Sept. 16, 1936 3 Sheets-Sheet 2

INVENTOR
WALTER ERNST
BY Soulmin & Soulmin
ATTORNEYS

Aug. 25, 1942. W. ERNST Re. 22,163

DOUBLE-ACTING PRESS

Original Filed Sept. 16, 1936 3 Sheets-Sheet 3

INVENTOR
WALTER ERNST

BY Toulmin & Toulmin
ATTORNEYS

Reissued Aug. 25, 1942

Re. 22,163

UNITED STATES PATENT OFFICE 22,163

DOUBLE-ACTING PRESS

Walter Ernst, Mount Gilead, Ohio

Original No. 2,167,941, dated August 1, 1939, Serial No. 101,110, September 16, 1936. Application for reissue July 22, 1941, Serial No. 403,591

13 Claims. (Cl. 113—45)

This invention relates to presses and, in particular, to hydraulic presses having blank-holding arrangements in association with drawing devices.

One object of this invention is to provide a hydraulic press having a clamping device arranged to provide a plurality of different clamping pressures at different points on the blank, thereby enabling the blank to be held more tightly along different portions of its periphery.

Another object is to provide a hydraulic press having a drawing plunger and a plurality of clamping plungers, together with means for maintaining different pressures in the different clamping plungers so as to hold the blank with different clamping pressures at different points, each clamping cylinder being arranged to enable the pressure therein to be adjusted independently of the pressures in the other clamping cylinders.

Another object is to provide a hydraulic press having a drawing plunger and a plurality of clamping plungers, together with means for maintaining different pressures in the clamping plungers so as to maintain different clamping forces at different parts of the blank, additional means being provided to prevent the release of pressure from the clamping cylinder from tending to equalize the pressure in other clamping cylinders.

Another object is to provide a hydraulic press having a drawing plunger and a plurality of clamping plungers operating in drawing and clamping cylinders, respectively, the pressure for operating the clamping cylinders being provided by the action of the drawing plunger in forcing the clamping plungers downwardly against the blank, means being provided for releasing pressure fluid from the different clamping cylinders at different predetermined pressures so as to enable the blank to be held at different points by different clamping pressures.

Another object is to provide a hydraulic press having a drawing plunger and a plurality of clamping plungers operating in drawing and clamping cylinders, respectively, the pressure for operating the clamping cylinders being provided by the action of the drawing plunger in forcing the clamping plungers downwardly against the blank, means being provided for releasing pressure fluid from the different clamping cylinders at different predetermined pressures so as to enable the blank to be held at different points by different clamping pressures, the press being provided with means whereby a part of the pressure generated in the clamping cylinders is utilized to force the clamping member downwardly, and thereby to assist the action of the drawing plunger instead of opposing it, as in other types of presses.

Another object is to provide a hydraulic press having a drawing plunger and a plurality of clamping plungers arranged to provide different clamping pressures among themselves, together with release of pressure fluid therefrom on the attainment of different predetermined pressures therein, means being provided to prevent the escape of pressure fluid upon the return stroke of the drawing plunger when the pressure releasing means is set at a low amount, thereby counteracting the effect of the pressure-releasing means during the return stroke of the press.

Still another object of the invention consists in the provision of a hydraulic blankholder press having a fluid operable press platen and a clamping cylinder associated therewith, in which fluid pressure may be created in said clamping cylinder by movement of said blankholder and may be conveyed during movement of said platen to a stationarily mounted gauge so as to allow adjustment of a pressure relief valve, hydraulically connected with said clamping cylinder, while said platen is moving.

Figure 2:
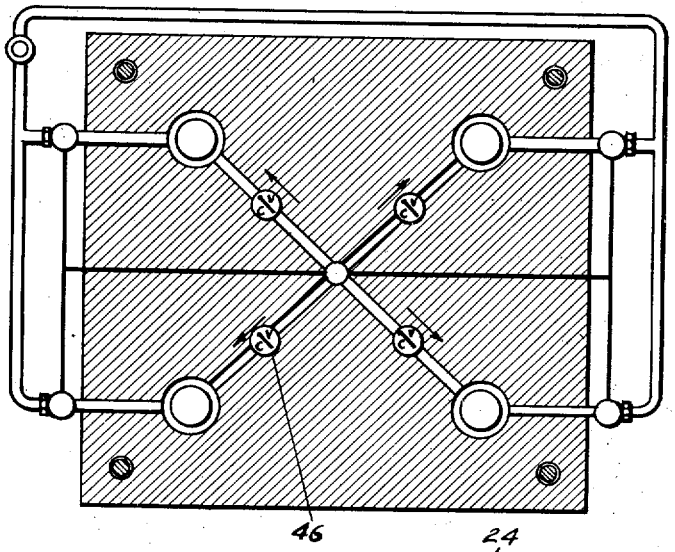
Figure 2 is a horizontal section along the line 2—2 in Figure 1.

In general, the press of this invention consists of a drawing plunger and a plurality of clamping plungers having relief valves associated with each clamping plunger for release of the pressure fluid therein at predetermined pressures, thereby enabling the different clamping plungers to exert different clamping pressures upon the blank. There is also provided a series of check valves adapted to prevent the individual relief valves from interfering with the action of each other, thereby preventing equalization of pressure between the different clamping cylinders by the discharges from their relief valves. A modified construction shown in Figure 3 also provides an arrangement wherein the blankholder pressure is partially utilized to assist the action of the drawing plunger rather than to oppose it as in other types of presses. The arrangement of Figure 1 also contains a provision whereby the action of the various relief valves is prevented during the return stroke by admitting fluid to the opposite side of the valve plunger, this arrangement enabling the moving parts to return on the return stroke, regardless of how low the relief valve setting may be.

The reason for providing a different clamping pressure at different portions of the blank arises from the fact that it is found that in drawing irregular work pieces it is often desirable to hold one portion of the periphery of the blank with a tighter clamping force than other portions. In the ordinary types of presses, wherein the same clamping pressure is provided on all portions of the blank, this variable blankholding force cannot be supplied. In the present invention, however, each individual clamping cylinder is equipped with its own relief valve and its own check valve so that a different clamping pressure can be built up on each one of the several clamping plungers.

Figure 1:
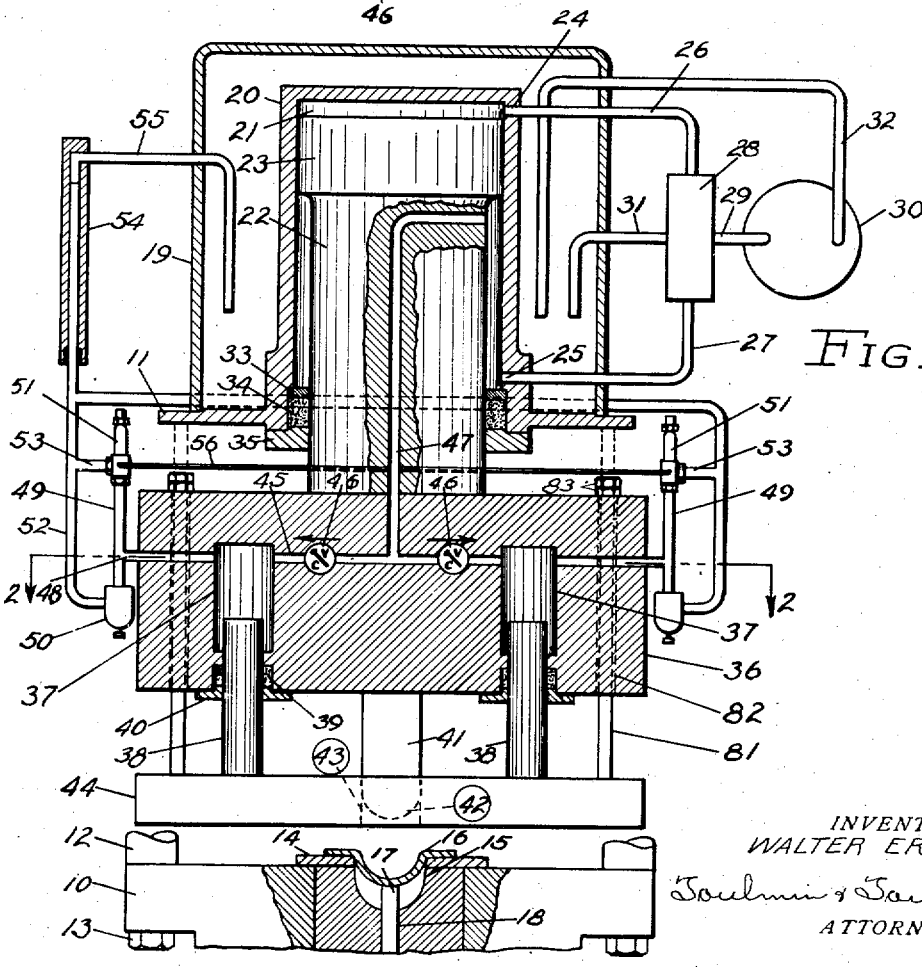
Figure 1 is a diagrammatic view, mainly in section, showing the working elements of a hydraulic metal drawing press circuit arranged according to this invention, with the upper portion of the press framework omitted to show the construction more clearly.

Referring to the drawings in detail, Figure 1 shows diagrammatically a hydraulic metal drawing press having a base member 10 connected to a top member 11 (reduced in size for clearness of showing) by means of tie rods 12, the latter being secured in position by means of the nuts 13 upon the ends thereof. Mounted in the base member 10 is a drawing die 14 having a die cavity 15 for receiving the blank 16. Associated with the die cavity 15 is a plunger 17 adapted to support the tip of the blank as it is being drawn, and passing through a bore 18 to its operating cylinder (not shown). The details of the supporting plunger 17 form no part of the present invention, and are shown in my copending application, Ser. No. 74,742, filed April 16, 1936, and now matured into Patent No. 2,136,240 granted Nov. 8, 1938.

The present invention may be employed either with flat blanks or with blanks which have already been subjected to one or more drawing operations. For convenience of disclosure, blank 16 is shown as having been subjected to one drawing operation, and in position for another drawing operation which will elongate it and cause it to be drawn downwardly into the die cavity 15.

Associated with the top member 11 of the press is a surge tank 19 for containing the fluid by which the press is actuated. Also associated with the top member 11 is the drawing or main cylinder 20, having a bore 21 within which reciprocates the double-acting drawing plunger 22 having a piston head 23 thereon. The cylinder 20 is provided with upper and lower ports 24 and 25 on opposite sides of the piston head 23, and adapted by means of pipes 26 and 27 to supply pressure fluid to advance or retract the drawing plunger 22, according to the manner in which the four-way valve 28 is manipulated. This valve 28 is of any suitable type known to those skilled in the art, and its details form no part of the present invention.

Leading from the four-way valve 28 is the pressure line 29 connected at its opposite end to the pump 30. A discharge line 31, also connected to the four-way valve 28, leads into the interior of the surge tank 19. The pump 30 is also provided with a suction line 32, likewise leading into the interior of the surge tank 19. The drawing cylinder 20 is supplied near the mouth of its bore 21 with a packing ring 33, beyond which is a packing 34 adapted to be compressed by a gland 35 so as to prevent leakage around the drawing plunger 22. Connected to the drawing plunger 22 is the platen 36, within which are arranged the clamping cylinders 37 having clamping plungers 38 operating therein. Each clamping plunger 38 is provided with a packing 39 and gland 40 for the prevention of leakage. Secured to the platen 36 is a drawing plunger or punch 41 having a nose portion 42 corresponding to the die cavity 15, and adapted to pass through an aperture 43 in the clamping member 44 secured to the outer ends of the clamping plungers 38.

Each of the clamping cylinders 37 is provided with a fluid passageway 45 leading by way of an outwardly opening check valve 46 to a common passageway 47, which extends upwardly through the drawing plunger 42 and opens into the drawing cylinder bore 21 immediately beneath the drawing plunger head 23. Consequently, fluid is free to pass from the pull-back or return side of the drawing plunger 23 into the clamping cylinders 37, but is prevented from passing in the opposite direction by the action of the check valves 46. Also passing outwardly from each clamping cylinder 37 is a fluid conduit 48 leading to an intermediate portion of a pipe 49, having on one end a safety valve 50 and on the other end a pressure relief valve 51. Leading from the discharge side of the safety valve 50 is a discharge line 52 connected to the discharge side of the relief valve 51 by the line 53.

The discharge line 52 passes upwardly into the telescoping cylinder 54, thereby forming a slip connection, enabling the telescoping cylinder 54 and the pipe 52 to move vertically relatively to each other, an action which necessarily occurs when the platen 36 moves downwardly in response to the action of the drawing plunger 22. A discharge line 55 leads from the telescoping cylinder 54 into the interior of the surge tank 19 and serves to discharge fluid expelled from the pressure relief valve 51 of the safety valve 50. The safety valve 50 is provided merely as an additional safety feature in the event of a jamming or other failure of the pressure relief valve 51, and is set at a higher pressure than the relief valve 51 so as to operate in case of the accumulation of a dangerous pressure within the corresponding clamping cylinder 37 and a failure of the corresponding pressure relief valve 51 to act. It will be seen from Figures 1 and 2 that each clamping cylinder is provided with its own pressure relief valve 51 and safety valve 50 so that a different pressure release point may be given to each clamping cylinder. The pressure relief valves 51 are connected to the drawing plunger passageway 47 by conduits 56 for the purpose of counteracting the action of the relief valves 51 during the return stroke of the drawing plunger 22, as is discussed below in connection with the description of the details of the relief valve 51.

Figure 6:
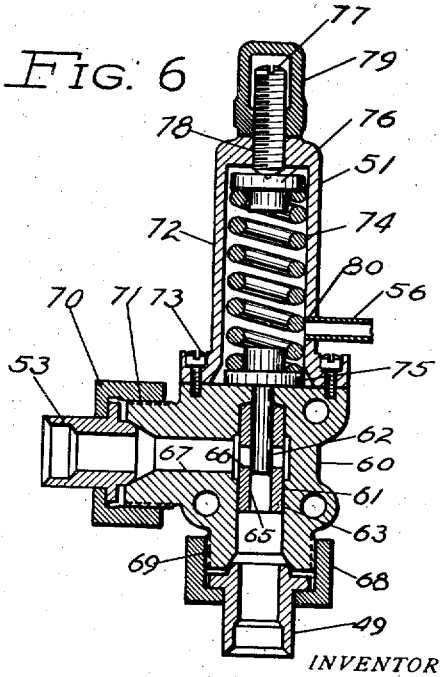
Figure 6 is a vertical section through a pressure relief valve employed in connection with the press circuit shown in Figure 1.

The relief valve 51 is shown in vertical section in Figure 6, and consist of a casing having a bore 61 within which reciprocates a valve plunger 62. Arranged between the valve plunger 62 and the bore 61 is a tubular member 63 having a longitudinal bore 65 and a cross bore 66, communicating therewith and opening into a transverse bore 67 in the casing 60. The end connection of the pipe 49 is held in communication with the bore 61 by means of the collar 68 engaging the threaded portion 69 of the casing 60, whereas the end of the pipe 53 is similarly held in communication with the transverse bore 67 by means of the threaded collar 70 engaging the threaded portion 71 of the casing (Figure 6).

Mounted on the upper portion of the casing 60 is a tubular cap 72 secured thereto by screws 73, within the cap 72 is a coil spring 74, one end of which engages an enlargement 75 upon the upper end of the valve plunger 62, whereas the opposite end engages a button 76 in contact with an adjusting screw 77 threaded through a bore 78 in the upper end of the cap 72. Surrounding and covering the adjusting screw 77 is a hollow nut 79 which serves to protect the adjusting screw 77 and also to lock it in its adjusted position. The cap 72 is provided with a port 80 receiving and communicating with the pipe 56 leading to the pull-back side of the drawing plunger 22, as shown in Figure 1.

Thus, when the same pressure fluid is admitted simultaneously to the valve 51, by way of the pipes 49 and 56 during the pull-back stroke of the press, the valve plunger 62 will be prevented from opening by means of this counteracting arrangement, as is more fully described under the operation thereof. The pipe 56 also serves during the return stroke of the press to receive and transmit the fluid which leaks into the interior of the cap 72 past the valve plunger 62. Thus, each safety valve 51 may be adjusted to discharge pressure fluid at a different predetermined pressure by differently adjusting the adjusting screw 77 to compress the springs 74 by different amounts. The clamping member 44 is provided with rods 81 passing through the vertical bores 82 in the platen 36, and having the nuts 83 on the upper ends thereof. The rods 81 limit the extent to which the clamping member 44 can move relatively to the platen 36.

In the operation of the form of press shown in Figures 1 and 2, the pump 30 is started and delivers pressure fluid to the four-way valve 28, which in turn, is set to deliver pressure fluid through the line 26 and port 24 into the space above the drawing plunger head 23. This pressure forces the drawing plunger 22 and platen 36 downwardly, carrying with them the clamping member 44. When the latter engages the periphery of the blank 16 and clamps it tightly against the die member 14, the clamping member 44 halts, but the platen 36 continues to move downwardly, forcing its drawing die or punch 41 into engagement with the blank 16. As the punch 41 moves downwardly it forces the central portion of the blank 16 into the die cavity 15 and overcomes the resistance of the supporting plunger 17, which protects the tip of the work piece or blank 16.

Meanwhile, pressure has been built up in the clamping cylinders 37 by reason of the relative motion between the platen 36 and the clamping member 44 to which the clamping plungers 38 are attached, and the fluid in the clamping cylinders 37 has been prevented from escaping by the closing of the outwardly opening check valves 46. When the pressure within each clamping cylinder 37 reaches the amount for which its corresponding relief valve 51 is set, the latter opens and discharges fluid through the line 53, into the discharge line 52 leading to the telescoping cylinder 54, and thence by the line 55 to the surge tank 19. In this manner each clamping plunger 38 may be caused to exert a different force upon the portion of the blank periphery which is engaged by the clamping member 44 in its vicinity.

When the drawing stroke of the press has been completed the setting of the four-way valve 28 is reversed so that pressure fluid flows through the line 27 and port 25, into the space beneath the drawing plunger head 23, causing the drawing plunger 22 to move upwardly. A portion of this pressure fluid, however, passes downwardly through the plunger passageway 47, the outwardly opening relief valves 46, to the passageways 45, into the clamping cylinders 37, causing their plungers 38 and the clamping member 44 to remain in clamping engagement with the blank 16 while the punch or drawing die 41 is withdrawn from the cavity 15 of the die 14. If the relief valves 51 have been set for a low clamping pressure it would, at first glance, seem that pressure fluid during the pull-back stroke would pass from the clamping cylinders 48 through the relief valve 51 and lines 52, 53 and 55, back into the surge tank 19, thus preventing the return of the moving parts. This, however, is prevented by the operation of the pipe line 56 leading from the valve cap 72 of the valve 51 to the passageway 47 within the drawing plunger 22. Consequently, during the pull-back stroke pressure fluid is applied simultaneously upon opposite sides of the valve plunger 62 within the relief valve 51, and prevents its opening regardless of how low a clamping pressure is provided by the setting of each relief valve 51. When the platen 36 has moved upwardly along the rods 81 it will engage the nuts 83 and lift the clamping member 42 free from engagement with the work piece 16, thereby enabling the operator to remove the work piece and also lifting the entire platen and blankholder assembly as a unit.

Figure 3:
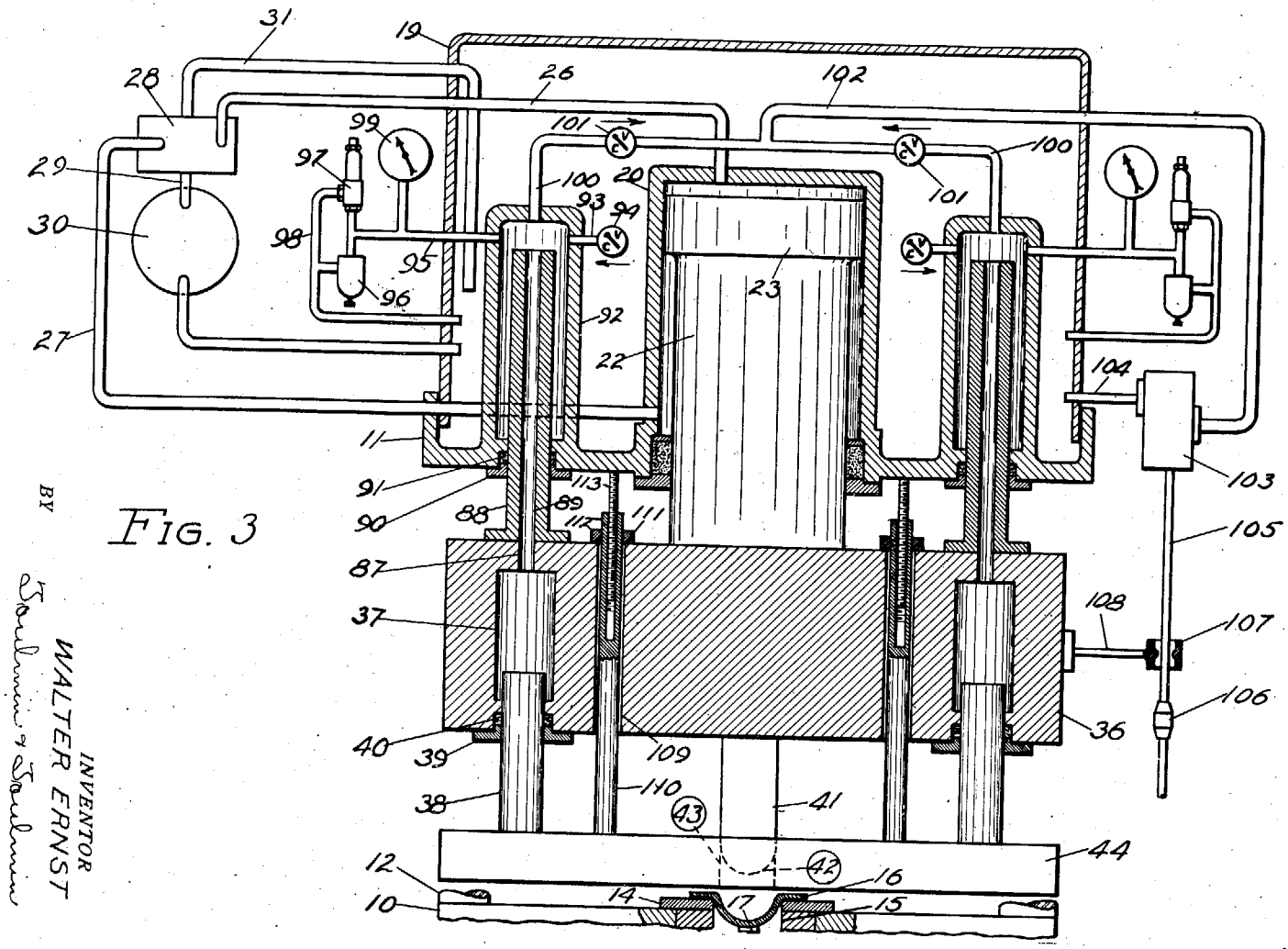
Figure 3 is a view similar to Figure 1 but of a modified form of hydraulic drawing press circuit for accomplishing a similar result.
Figure 4:
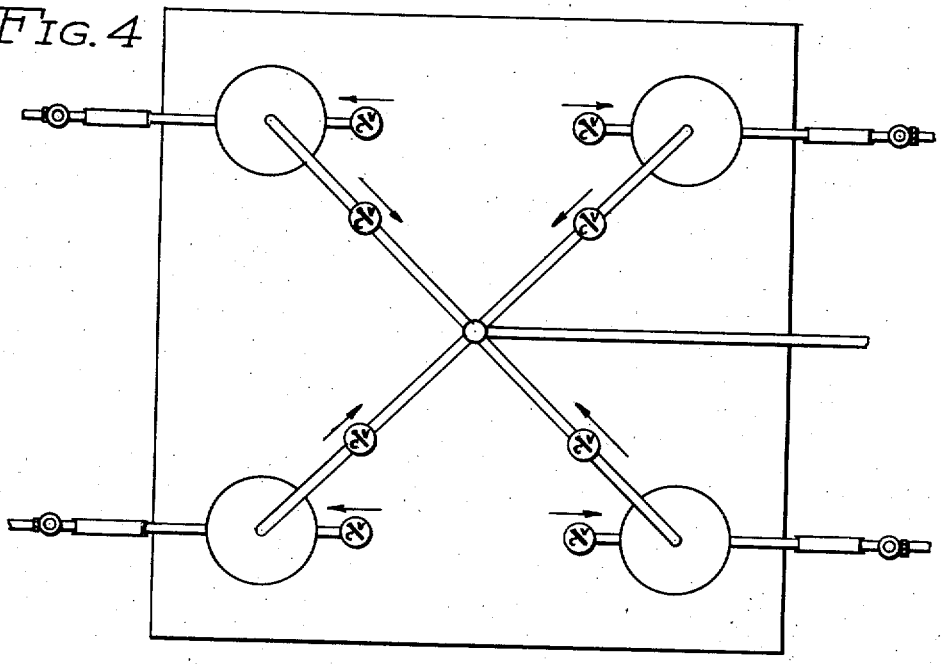
Figure 4 is a diagrammatic plan view showing the connections between the various cylinders of the press in Figure 3.

The modified form of press shown in Figures 3 and 4 has a base portion 10, tie rods 12, die 14 and supporting plunger 18 similar to those of the press shown in Figure 1. A pump 30 and four-way valve 48 are similarly provided, and the latter has similar forward and reverse pressure lines 26 and 27, respectively, leading to the opposite sides of the drawing plunger head 23 within the drawing cylinder 20. Other corresponding parts are given like reference numerals. In this form of press, however, the drawing plunger 22 is of solid construction, and the clamping plunger cylinders 37 are provided with passages 87 leading into tubular plungers 88 mounted upon the upper side of the platen 36, and having bores 89 therethrough. The hollow plungers 88 pass through glands 90 and packings 91 into cylinders 92 arranged on the press top member 11 and within the surge tank 19. From each cylinder 92 the line 93 leads through the check valve 94 to the interior of the surge tank 19. Each check valve 94 opens in the direction of the cylinder 93 so that the latter may draw in fluid upon the descent of the hollow plungers 88. The check valves 94, however, will close upon the ascent of the plungers 88.

From each cylinder 92 a T-shaped line 95 also leads to a safety valve 96 and a pressure relief valve 97. These valves 96 and 97 are similar to the safety valves 50 and pressure relief valves 51 described in connection with Figure 1, with the exception of the fact that the connection 56 to the port 80 in the valve cap 72 is omitted. The valves 96 and 97 discharge into the discharge line 98 leading to the interior of the surge tank 19. A pressure gauge 99 is provided in each line 95 to indicate the pressure existing in the clamping cylinder 37. Inasmuch as the cylinder 92 is stationary, it will be clear that also the conduit 95 and gauge 99 can be arranged stationarily. This is of great importance since, in this way, the clamping pressure developed in each clamping cylinder can be read on a respective stationary gauge, so that the adjustment of the relief valve 97 may be effected while the platen 36 is moving. Extending from each cylinder 92 is a line 100 having therein a check valve 101 opening in a direction away from the cylinder 92. Beyond the check valves 101 the lines 100 join a common line 102 leading to a normally open valve 103, having a discharge line 104 leading therefrom to the surge tank 19. The valve 103 is provided with a valve rod 105 having an adjustable stop 106 thereon adapted to be engaged by the end 107 of a platen arm 108 secured to the platen 36. The platen 36 is provided with bores 109 adapted to receive the rods 110, the lower ends of which are secured to the clamping member 44, and the upper ends of which are provided with nuts 111 threaded thereon. The upper ends of the rods 110 are also provided with threaded sockets 112 in which are inserted the threaded rods 113. This arrangement enables an adjustment of the effective length of the rods 110 and enables the point at which these rods 110 serve as knock-out rods to be varied as desired.

In ordinary drawing presses it will be seen that during a drawing operation the pressure exerted by the clamping plungers 38 and the clamping member 44 is subtracted from the useful drawing force exerted by the drawing plunger 22 because the drawing plunger 22 must overcome the intensified pressure on the clamping plungers 38 within the clamping cylinders 37. Where the clamping pressures are low, the effect of this arrangement is not serious. If, however, a high pressure is employed for clamping the blanks the reduction in drawing force by the withdrawal of force for the clamping plungers may be quite serious. It is for this reason that the modified arrangement shown in Figure 3 was devised. The pressure generated by the relative motion between the platen 36 and the halted blankholder or clamping member 44 still produces the blankholder clamping pressure, but this pressure now flows through the hollow plungers 88 and helps to advance the platen 36 by operating on the annular heads of the plungers 88. Any desired proportion of the pressure on the clamping plungers 38 can thus be balanced, and the main or drawing plunger 22 will only have to overcome the difference between the pressures on the ends of the plungers 38 and 88. In this manner it is possible to exert very great clamping pressures with comparatively small main or drawing plunger pressures.

In the operation of the press and circuit shown in Figures 3 and 4, the pump 30 is started and valve 28 is set to discharge pressure fluid through the forward line 26 leading to the space above the drawing plunger head 23. The drawing plunger 22 then moves downwardly, carrying with it the platen 36 and the hollow plungers 88. The suction thereby created in the cylinders 92 opens the check valves 94 and causes fluid to be drawn into the cylinders from the surge tank 19. When the blankholder or clamping member 44 descends to a point where it engages the work piece 16, however, a relative motion occurs between the now halted blankholder 44 and platen 36 as the latter continues to advance and move its drawing die or punch 41 into engagement with the work piece 16.

Pressure thus accumulates in the clamping cylinders 37 and is transmitted through the passages 89 of the hollow plungers 88 into the cylinders 92. Normally this pressure would be free to pass through the lines 100, check valves 101, line 102, normally open valve 103 and line 104 into the surge tank 19. By this time, however, the platen 36 has descended to a point whereat the end 107 of the platen arm 108 has engaged the stop 106 and moved the valve rod 105 downwardly, thereby closing the normally open valve 103 and cutting off this means of escape for the fluid from the cylinders 92. The check valves 94 in the lines 93 also close against the pressure in the cylinders 92. This leaves the lines 95 as the sole means of escape for the fluid. Consequently, when the pressure in each line 95 exceeds the setting of its relief valve 97, the latter will open and discharge fluid through its discharge line 98 into the surge tank 19. In the event that the pressure relief valve 97 jams or fails for other reasons, the safety valve 96, which is set for a higher pressure, will open and discharge the fluid, thereby preventing damage to the press. By adjusting the relief valves 97 to discharge at different pressures the clamping cylinders 37 and their clamping plungers 38 may be caused to exert different clamping pressures upon the clamping member of blankholder 44, and hence, apply different amounts of pressure to different points on the periphery of the work piece 16. The check valves 101 prevent the equalization of pressures between the several cylinders 92, consequently, the intensified pressure built up in the clamping cylinders 37 acts against the clamping plungers 38 to clamp the work piece 16. At the same time a portion of this pressure fluid passing through the bore 89 of each hollow plunger 88 acts against the annular top surface thereof, and urges each plunger 88 in a downward direction, thereby assisting the action of the main or drawing plunger 22.

As soon as the drawing operation has been completed, the operator shifts the four-way control valve 28 to cause the pump 30 to discharge pressure fluid through the line 27 into the space beneath the drawing plunger head 23. This pressure raises the drawing plunger 22 and the platen 36, together with the hollow plungers 88. At the start of this operation, however, the platen arm 108 is still holding the normally open valve 103 in a closed position, hence, the plungers 88 cannot return against the pressure already built up in the cylinders 92 without displacing fluid into the clamping cylinders 37 within the platen 36. This pressure fluid, so displaced, acts against the clamping plungers 38 and tends to separate the platen 36 and the clamping member or blankholder 44 until both have traveled a distance sufficient to enable the platen arm 108 to release the stop 106 upon the valve rod 105 and permit the valve 103 to resume its normally open position. When this occurs the fluid can escape from the cylinders 92 through the lines 100, the check valves 101, the line 102, the valve 103 and the line 104 into the surge tank 19, permitting the entire assembly to execute its return stroke. The adjustable arrangement shown on the rods 110 serves to separate the platen 36 and the blankholder 44 in a positive manner in case both of these should be held together by reason of the work piece 16 adhering to the drawing die or punch 41.

Thus by the present invention a full blankholding pressure can be exerted by supplying only a fraction of it by means of the main or drawing plunger 22, through the aid of the hollow plungers 88. The arrangement of the check valves 101 and the normally open platen-closed valve 103 enables the pressure to be released through the single valve 103 without, however, equalizing the pressures in the cylinders 92. Without the check-valves 101 the pressures in all cylinders would equalize, thereby defeating the purpose of the individual relief valves 97.

In the arrangement shown in both forms of presses in Figures 1 and 3, respectively, the main or drawing cylinder 20 has been shown arranged for descent merely by pressure from the pump 30 through the line 26. It will be understood, however, that a surge valve may be mounted in the top of the cylinder 20 and operated in the manner shown in my copending application, Ser. No. 74,742, filed April 16, 1936, thereby enabling the descent of the drawing plunger 22 by gravity and the prefilling of the cylinder 20 through such a surge valve. This surge valve has been omitted from the present circuits for the purpose of simplifying the showing.

Figure 5:
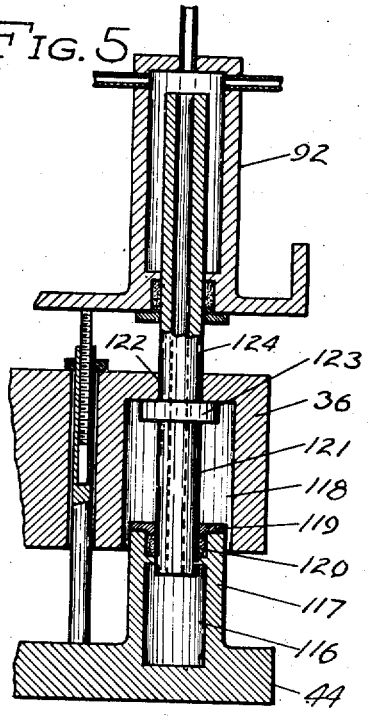
Figure 5 is a view of a portion of Figure 3 of modified construction as regards the clamping cylinder.

The modified construction shown in Figure 5 has the same purpose as the hollow plungers 88 and cylinders 92 in Figure 3. In this arrangement, however, the blankholder or clamping member 44 is provided with clamping cylinders 116 in upwardly projecting portions 117 adapted to enter corresponding recesses 118 in the platen 36. Glands 119 and packings 120 prevent the escape of fluid from around the hollow clamping plungers 121, these being mounted in bores 122 in the upper walls of the recesses 118 in the platen 36. Each plunger 121 is provided with an enlargement 123 adapted to engage the upper or end wall of the recess 118. Formed integral with the clamping plungers 121, in this arrangement, and extending vertically upward therefrom are the hollow plunger portions 124 leading into the cylinders 92, previously described. While this construction is a modification of that shown in Figure 3, the operation is substantially identical and requires no additional description.

It will be understood that a separate pressure may be applied to each clamping plunger by employing a different pump for each clamping plunger rather than a single pump with four different pressure relief valves. In this manner each pump may be set to deliver the predetermined and desired pressure to its own particular clamping plunger. In Figure 3, instead of the hollow plungers shown, solid plungers may be used with any suitable arrangement for conducting fluid from the clamping cylinders 37 to the cylinders 92, such as, for example, a flexible conduit.

It will be understood that I desire to comprehend within this invention such modifications as come within the scope of the claims and the invention.

Having thus fully described my invention, what I claim as new and desire to secure by Letters Patent, is:

1. In combination in a drawing press, a press frame having a main cylinder and an auxiliary cylinder, a main plunger in said main cylinder, a platen operated thereby, a hollow auxiliary plunger connected to said platen and reciprocable in said auxiliary cylinder, a clamping cylinder associated with said platen and communicating with said hollow auxiliary plunger, a clamping plunger adapted to clamp the work piece during the drawing operation, and an adjustable pressure relief valve for said clamping cylinder adapted to effect the discharge of pressure fluid from said clamping cylinder at a predetermined pressure, the working surfaces on the heads of said auxiliary plunger and main plunger being positioned in similar directions relatively to said platen whereby the pressure fluid generated in said clamping cylinder during the clamping operation acts against said auxiliary plunger to assist the urge imparted to said platen by said main plunger.

2. In combination in a drawing press, a press head having a drawing cylinder, a drawing plunger therein, a platen operated by said drawing plunger, clamping piston and cylinder assemblies associated with said platen and operated by the motion thereof, auxiliary cylinders mounted on said press head, auxiliary hollow plungers connected to said platen and communicating with said clamping cylinders and reciprocable in said auxiliary cylinders, and a pressure relief device for each auxiliary cylinder adapted to discharge fluid therefrom in response to the attainment of a predetermined pressure therein, the working surfaces on the heads of said auxiliary plunger and said drawing plunger being positioned in similar directions relatively to said platen, whereby the pressure fluid generated in said clamping cylinders during the clamping operation acts against said auxiliary plungers to assist the urge imparted to said platen by said main plunger.

3. In combination in a drawing press, a drawing cylinder, a drawing plunger therein, a platen operated by said drawing plunger, clamping piston and cylinder assemblies associated with said platen and operated by the motion thereof, auxiliary cylinders, auxiliary hollow plungers connected to said clamping cylinders and reciprocable in said auxiliary cylinders, a pressure relief device for each auxiliary cylinder adapted to discharge fluid therefrom in response to the attainment of a predetermined pressure therein, a conduit adapted to discharge fluid from said auxiliary cylinders, a normally open valve in said conduit, and means responsive to the attainment of a predetermined position of said platen for closing said normally open valve to prevent the further discharge of the fluid through said conduit.

4. In combination in a drawing press, a drawing cylinder, a drawing plunger therein, a platen operated by said drawing plunger, clamping piston and cylinder assemblies associated with said platen and operated by the motion thereof, auxiliary cylinders, auxiliary hollow plungers connected to said clamping cylinders and reciprocable in said auxiliary cylinders, a pressure relief device for each auxiliary cylinder adapted to discharge fluid therefrom in response to the attainment of a predetermined pressure therein, a conduit adapted to discharge fluid from said auxiliary cylinders, a normally open valve in said conduit, means responsive to the attainment of predetermined position of said platen for closing said normally open valve to prevent the further discharge of the fluid through said conduit, and unidirectional means in said conduit for permitting the flow of fluid from said auxiliary cylinders to said normally open valve but adapted to prevent the flow of fluid from one auxiliary cylinder to another auxiliary cylinder.

5. In combination in a drawing press, a drawing cylinder, a drawing plunger therein, a platen operated by said drawing plunger, clamping piston and cylinder assemblies associated with said platen and operated by the motion thereof, auxiliary cylinders, auxiliary hollow plungers connected to said clamping cylinders and reciprocable in said auxiliary cylinders, a pressure relief device for each auxiliary cylinder adapted to discharge fluid therefrom in response to the attainment of a predetermined pressure therein, a fluid tank, a conduit connecting each auxiliary cylinder with said fluid tank, and a check valve in said conduit for permitting the drawing in of fluid in response to the suction created in said auxiliary cylinders by the descent of said auxiliary plungers.

6. In combination in a drawing press, a press head having a drawing cylinder, a drawing plunger therein, a platen operated by said drawing plunger, clamping piston and cylinder assemblies associated with said platen and operated by the motion thereof, auxiliary cylinders mounted on said press head, auxiliary plungers movable in said auxiliary cylinders and connected to said platen, means for conducting fluid between said clamping cylinders and said auxiliary cylinders, and a pressure relief device for each auxiliary cylinder adapted to discharge fluid therefrom in response to the attainment of a predetermined pressure therein, the working surfaces on the heads of said auxiliary plunger and said drawing plunger being positioned in similar directions relatively to said platen, whereby the pressure fluid generated in said clamping cylinders during the clamping operation acts against said auxiliary plungers to assist the urge imparted to said platen by said main plunger.

7. In combination in a drawing press, a drawing cylinder, a drawing plunger therein, a platen operated by said drawing plunger, clamping piston and cylinder assemblies associated with said platen and operated by the motion thereof, auxiliary cylinders, auxiliary plungers movable in said auxiliary cylinders, means for conducting fluid between said clamping cylinders and said auxiliary cylinders, a pressure relief device for each auxiliary cylinder adapted to discharge fluid therefrom in response to the attainment of a predetermined pressure therein, a conduit adapted to discharge fluid from said auxiliary cylinders, a normally open valve in said conduit, and means responsive to the attainment of a predetermined position of said platen for closing said normally open valve to prevent the further discharge of fluid through said conduit.

8. In combination in a drawing press, a drawing cylinder, a drawing plunger therein, a platen operated by said drawing plunger, clamping piston and cylinder assemblies associated with said platen and operated by the motion thereof, auxiliary cylinders, auxiliary plungers movable in said auxiliary cylinders, means for conducting fluid between said clamping cylinders and said auxiliary cylinders, a pressure relief device for each auxiliary cylinder adapted to discharge fluid therefrom in response to the attainment of a predetermined pressure therein, a conduit adapted to discharge fluid from said auxiliary cylinders, a normally open valve in said conduit, means responsive to the attainment of a predetermined position of said platen for closing said normally open valve to prevent the further discharge of fluid through said conduit, and unidirectional means in said conduit for permitting the flow of fluid from said auxiliary cylinders to said normally open valve but adapted to prevent the flow of fluid from one auxiliary cylinder to another auxiliary cylinder.

9. In combination in a drawing press, a drawing cylinder, a drawing plunger therein, a platen operated by said drawing plunger, clamping piston and cylinder assemblies associated with said platen and operated by the motion thereof, auxiliary cylinders, auxiliary plungers movable in said auxiliary cylinders, means for conducting fluid between said clamping cylinders and said auxiliary cylinders, a pressure relief device for each auxiliary cylinder adapted to discharge fluid therefrom in response to the attainment of a predetermined pressure therein, a fluid tank, a conduit connecting each auxiliary cylinder with said fluid tank, and a check valve in said conduit for permitting the drawing in of fluid in response to the suction created in said auxiliary cylinders by the descent of said auxiliary plungers.

10. In combination in a drawing press, a drawing plunger, a platen operatively connected with said drawing plunger, fluid operable clamping cylinder-piston-assemblies associated with said platen and operable by the motion thereof, a plurality of stationarily mounted pressure relief devices, at least two of said relief devices being associated with two separate cylinders of said clamping cylinder-piston-assemblies and being adapted to discharge fluid therefrom in response to the establishment of a predetermined pressure therein, a plurality of stationary conduits, each being connected with one of said relief devices, means respectively associated with each of said clamping cylinders and continuously hydraulically connecting each clamping cylinder with one of said conduits, and pressure gauges respectively connected with said stationary conduits for indicating the pressure in the respective clamping cylinder during movement of said platen.

11. In a hydraulic blankholder press, a fluid operable press platen, fluid operable clamping cylinder-piston-assemblies associated with said platen and adapted to develop pressure in response to the movement of said platen, stationarily mounted adjustable relief valves respectively associated with the cylinders of said clamping cylinder-piston-assemblies for relieving pressure therefrom at the establishment of a predetermined pressure in said clamping cylinders, each of said relief valves being hydraulically connected with a stationary gauge for indicating the clamping pressure in the respective clamping cylinder during movement of said platen, and means continuously establishing hydraulic connection between said cylinders and the respective relief valves.

12. In a blankholder press, a fluid operable drawing platen, a fluid operable cylinder-piston-assembly associated with said platen and adapted to develop pressure by movement of said platen, a stationarily mounted pressure relief valve associated with said clamping cylinder-piston-assembly for relieving pressure therefrom in excess of a predetermined pressure in said clamping cylinder-piston-assembly, and a gauge arranged at a stationary point of the press and in continuous hydraulic communication with said valve, said gauge communicating through connecting means with said clamping cylinder-piston-assembly for indicating the clamping pressure in said cylinder-piston-assembly during movement of said platen.

13. In combination in a drawing press, a drawing cylinder, a drawing plunger therein, a platen operated by said drawing plunger, a clamping cylinder-piston-assembly associated with said platen and operated by the motion thereof, said clamping cylinder-piston-assembly including an auxiliary cylinder and a hollow auxiliary plunger reciprocable in said auxiliary cylinder, a pressure relief device associated with said clamping cylinder-piston-assembly to discharge fluid therefrom in response to the attainment of a predetermined pressure therein, a fluid tank, a conduit connecting said clamping cylinder-piston-assembly with said fluid tank, and a check valve for permitting the drawing in of fluid in response to the suction created in said clamping cylinder-piston-assembly by the descent of the platen.

WALTER ERNST.